US012811758B2

(12) United States Patent
Ekpenyong et al.

(10) Patent No.: US 12,811,758 B2
(45) Date of Patent: *Nov. 24, 2026

(54) CSI REPORTING IN PUSCH FOR CARRIER AGGREGATION

(71) Applicant: Texas Instruments Incorporated, Dallas, TX (US)

(72) Inventors: Anthony Edet Ekpenyong, San Diego, CA (US); Runhua Chen, Plano, TX (US); Eko Nugroho Onggosanusi, Coppell, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,323

(22) Filed: Jan. 11, 2024

(65) Prior Publication Data

US 2024/0146489 A1 May 2, 2024

Related U.S. Application Data

(63) Continuation of application No. 17/322,476, filed on May 17, 2021, now Pat. No. 11,876,752, which is a (Continued)

(51) Int. Cl.
*H04L 5/00* (2006.01)
*H04L 1/00* (2006.01)
*H04W 24/10* (2009.01)

(52) U.S. Cl.
CPC .......... *H04L 5/0094* (2013.01); *H04L 1/0031* (2013.01); *H04L 5/001* (2013.01);

(Continued)

(58) Field of Classification Search
CPC ..... H04L 5/0094; H04L 1/0031; H04L 5/001; H04L 5/0023; H04L 1/0026;

(Continued)

(56) References Cited

U.S. PATENT DOCUMENTS 8,565,168 B2 10/2013 Papasekellariou et al.
8,644,182 B2 2/2014 Seo et al.

(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS36.211, Release 9, V9.1.0, Mar. 2010, Valbonne, France (85 pages).

(Continued)

*Primary Examiner* — Hoang-Chuong Q Vu
(74) *Attorney, Agent, or Firm* — Gregory J. Albin; Frank D. Cimino

(57) ABSTRACT

Carrier aggregation allows concurrent transmission on multiple component carriers (CC) to increase the data rate. A user equipment (UE) device in a cellular network provides periodic or aperiodic channel state information of the DL channel to a base station (eNB) for each of the aggregated CCs. The UE receives two or more reference signals corresponding to two or more aggregated CCs from an eNB. The UE computes a plurality of channel state information (CSI) reports for each of two or more aggregated CCs derived from the two or more reference signals. The UE receives a positive CSI request from the eNB for a CSI report and transmits CSI feedback to the eNB comprising one or more CSI reports selected from the plurality of CSI reports.

10 Claims, 4 Drawing Sheets

Related U.S. Application Data continuation of application No. 15/697,995, filed on Sep. 7, 2017, now Pat. No. 11,012,224, which is a continuation of application No. 13/160,900, filed on Jun. 15, 2011, now Pat. No. 9,762,372.

(60) Provisional application No. 61/418,614, filed on Dec. 1, 2010, provisional application No. 61/414,139, filed on Nov. 16, 2010, provisional application No. 61/374,339, filed on Aug. 17, 2010, provisional application No. 61/373,913, filed on Aug. 16, 2010, provisional application No. 61/359,929, filed on Jun. 30, 2010, provisional application No. 61/354,797, filed on Jun. 15, 2010.

(52) U.S. Cl.
CPC .......... *H04L 5/0048* (2013.01); *H04L 5/0057* (2013.01); *H04L 1/0026* (2013.01); *H04L 5/0023* (2013.01); *H04W 24/10* (2013.01)

(58) Field of Classification Search
CPC . H04L 1/0027; H04L 27/2613; H04L 5/0046; H04L 5/0048; H04L 5/0057; H04W 24/10
See application file for complete search history.

(56) References Cited

U.S. PATENT DOCUMENTS

| | | | | |
|---|---|---|---|---|
| 8,737,301 | B2 * | 5/2014 | Von Elbwart | H04L 1/003 370/328 |
| 8,824,396 | B2 * | 9/2014 | Pedersen | H04L 1/1812 370/252 |
| 9,025,473 | B2 * | 5/2015 | Ko | H04L 1/0026 370/332 |
| 9,049,618 | B2 | 6/2015 | Guo et al. | |
| 9,060,283 | B2 | 6/2015 | Ko et al. | |
| 9,143,304 | B2 | 9/2015 | Lee et al. | |
| 9,154,215 | B2 * | 10/2015 | Noh | H04W 72/0453 |
| 9,629,137 | B2 | 4/2017 | Kim et al. | |
| 2010/0115358 | A1 * | 5/2010 | Kotecha | H04L 1/1812 714/748 |
| 2010/0184489 | A1 | 7/2010 | Penther et al. | |
| 2010/0195594 | A1 | 8/2010 | Seo et al. | |
| 2010/0246561 | A1 | 9/2010 | Shin et al. | |
| 2010/0271970 | A1 | 10/2010 | Pan et al. | |
| 2010/0272048 | A1 | 10/2010 | Pan et al. | |
| 2010/0303011 | A1 * | 12/2010 | Pan | H04L 5/001 370/328 |
| 2011/0116530 | A1 | 5/2011 | Sambhwani | |
| 2011/0243012 | A1 * | 10/2011 | Luo | H04L 5/0057 370/252 |
| 2011/0243066 | A1 | 10/2011 | Nazar | |
| 2011/0249578 | A1 | 10/2011 | Nazer | |
| 2011/0268067 | A1 | 11/2011 | Seo et al. | |
| 2011/0274043 | A1 | 11/2011 | Nam et al. | |
| 2011/0281615 | A1 * | 11/2011 | Yamada | H04L 1/1812 455/524 |
| 2011/0299484 | A1 | 12/2011 | Nam et al. | |
| 2011/0317652 | A1 | 12/2011 | Kim et al. | |
| 2012/0008574 | A1 | 1/2012 | Xiao et al. | |
| 2012/0033643 | A1 * | 2/2012 | Noh | H04L 25/0226 370/335 |
| 2012/0039322 | A1 | 2/2012 | Tee et al. | |
| 2012/0040622 | A1 | 2/2012 | Ren et al. | |
| 2012/0044894 | A1 | 2/2012 | Ko et al. | |
| 2012/0076017 | A1 * | 3/2012 | Luo | H04L 1/0027 370/252 |
| 2012/0113909 | A1 | 5/2012 | Jen | |
| 2012/0155408 | A1 | 6/2012 | Pedersen et al. | |
| 2012/0188976 | A1 | 7/2012 | Kim et al. | |
| 2012/0252474 | A1 * | 10/2012 | Tiirola | H04L 5/0091 455/450 |
| 2012/0257531 | A1 | 10/2012 | Ko et al. | |
| 2012/0263129 | A1 | 10/2012 | Noh et al. | |
| 2012/0281582 | A1 | 11/2012 | Yang et al. | |
| 2012/0327883 | A1 | 12/2012 | Yang et al. | |
| 2013/0028345 | A1 | 1/2013 | Ko et al. | |
| 2013/0039327 | A1 | 2/2013 | Gao et al. | |
| 2013/0077523 | A1 | 3/2013 | Ko et al. | |
| 2017/0135079 | A1 | 5/2017 | Kim et al. | |
| 2024/0413958 | A1 * | 12/2024 | Gauvreau | H04L 5/0098 |

OTHER PUBLICATIONS

3GPP, "3rd Generation Partnership Project; Technical Specification Group Radio Access Network; Evolved Universal Terrestrial Radio Access (E-UTRA); Physical layer procedures", 3GPP TS 36.213, Release 8, V8.5.0, Dec. 2008, Valbonne, France (74 pages).

3GPP, "3rd Generation Partnership Project; Technical Specification Group Radio Access Network WG1" (TSG RAN WG1), "UCI Multiplexing on PUSCH for Rel-10 US SU-MIMO", 3GPP R1-103329, Meeting 61, Agenda Item 6.4.3, Montreal, Canada, May 10-14, 2010 (2 pages).

3GPP, "3rd Generation Partnership Project; Technical Specification Group Radio Access Network WG1" (TSG RAN WG1), "CSI reporting for Carrier Aggregation", Nokia Siemens Networks, Nokia, 3GPP R1-102952, Meeting #60bis, Agenda Item 6.2.7, Beijing, China, Apr. 12-16, 2010 (2 pages).

3GPP, "3rd Generation Partnership Project; Technical Specification Group Radio Access Network WG1" (TSG RAN WG1), "Way-forward on CSI Feedback Design for Rel-10 DL MIMO", 3GPP R1-103419, Meeting 61, Agenda Item 6.3.4, Montreal Canada, May 10-14, 2010 (2 pages).

3GPP, "3rd Generation Partnership Project; Technical Specification Group Radio Access Network WG1" (TSG RAN WG1), "UCI Transmission on PUSCH for Carrier Aggregation", Texas Instruments, 3GPP R1-103694, Meeting #61bis, Agenda Item 6.2.7, Dresden, Germany, Jun. 28-Jul. 2, 2010 (6 pages).

3GPP, "3rd Generation Partnership Project; Technical Specification Group Radio Access Network WG1" (TSG RAN WG1), "UCI mapping on PUSCH with Carrier Aggregation", Nokia Siemens Networks, Nokia, 3GPP R1-103796, Meeting #61bis, Agenda Item 6.2.7, Dresden, Germany, Jun. 28-Jul. 2, 2010 (1 page).

3GPP, "3rd Generation Partnership Project; Technical Specification Group Radio Access Network WG1" (TSG RAN WG1) "UCI on PUSCH for carrier aggregation", Huawei, 3GPP R1-103890, Meeting #61bis, Agenda Item 6.2.7, Dresden, Germany, Jun. 28-Jul. 2, 2010 (3 pages).

3GPP, "3rd Generation Partnership Project; Technical Specification Group Radio Access Network WG1" (TSG RAN WG1) "PUSCH Selection for UCI Multiplexing with UL CA", Samsung, 3GPP R1-103649, Meeting #61bis, Agenda Item 6.2.7, Dresden, Germany, Jun. 28-Jul. 2, 2010 (3 pages).

3GPP, "3rd Generation Partnership Project; Technical Specification Group Radio Access Network WG1" (TSG RAN WG1) "Periodic CQI Reporting for Carrier Aggregatin", Panasonic, 3GPP R1-102861, Meeting 61, Agenda Item 6.2.4.3, May 10-14, 2010, Montreal, Canada (4 pages).

Prosecution History, U.S. Appl. No. 15/697,995, filed Sep. 7, 2017, 365 pages.

Prosecution History, U.S. Appl. No. 13/160,900, filed Jun. 15, 2011, 619 pages.

Prosecution History, U.S. Appl. No. 17/322,476, filed May 17, 2021, 174 pages.

* cited by examiner

CSI REPORTING IN PUSCH FOR CARRIER AGGREGATION

CLAIM TO PRIORITY

This application is a continuation of U.S. application Ser. No. 17/322,476 filed May 17, 2021, which is a continuation of U.S. application Ser. No. 15/697,995 filed Sep. 7, 2017, (now U.S. Pat. No. 11,012,224 issued May 18, 2021), which is a continuation of U.S. application Ser. No. 13/160,900 filed Jun. 15, 2011 (now U.S. Pat. No. 9,762,372 issued Sep. 12, 2017), which claims the benefit of: U.S. Provisional Application No. 61/354,797 filed Jun. 15, 2010; U.S. Provisional Application No. 61/359,929 filed on Jun. 30, 2010; U.S. Provisional Application No. 61/373,913 filed Aug. 16, 2010; U.S. Provisional Application No. 61/374,339 filed Aug. 17, 2010; U.S. Provisional Application No. 61/414,139 filed Nov. 16, 2010; and U.S. Provisional Application No. 61/418,614 filed Dec. 1, 2010, the contents of each of the above-mentioned applications being incorporated herein by reference in their entirety.

FIELD OF THE INVENTION

This invention generally relates to wireless cellular communication, and in particular to carrier aggregation in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware may be portable.

User equipment (UE), also commonly referred to as a terminal or a mobile station, may be a fixed or mobile device and may be a wireless device, a cellular phone, a personal digital assistant (PDA), a wireless modem card, and so on. Uplink communication (UL) refers to a communication from the UE to the NodeB, whereas downlink (DL) refers to communication from the NodeB to the UE. Each NodeB contains radio frequency transmitter(s) and the receiver(s) used to communicate directly with the UE, which may move freely around it. Similarly, each UE contains radio frequency transmitter(s) and the receiver(s) used to communicate directly with the NodeB. In cellular networks, the UE cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). The Technical Standards Group Radio Access Network (TSG RAN) group is responsible for the definition of the functions, requirements and interfaces of the UTRA/E-UTRA network in its two modes, FDD & TDD. OFDMA (orthogonal frequency division multiple access) and SC-FDMA (single carrier FDMA) access schemes were chosen for the down-link (DL) and up-link (UL) of E-UTRA, respectively. User equipments are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides some allocated UL resource and timing advance information to allow the UE to transmit on the PUSCH. The general operations of the physical channels are described in the EUTRA specifications, for example: "3rd Generation Partnership Project; Technical Specification Group Radio Access Network; Evolved Universal Terrestrial Radio Access (E-UTRA); Physical Channels and Modulation (TS 36.211 Release 8, or later)."

Several types of physical channels are defined for the LTE downlink. One common characteristic of physical channels is that they all convey information from higher layers in the LTE stack. This is in contrast to physical signals, which convey information that is used exclusively within the physical (PHY) layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. In downlink transmission, two types of reference signals are available. The first type of reference signal is un-precoded and is transmitted over the entire system bandwidth of a cell, and is generally referred to as cell-specific reference signal (CRS). Another type of reference signal is modulated by the same precoder as applied on the data channel, and therefore enables a UE to estimate the effective precoded MIMO (multiple input multiple output) channel characteristics. This type of RS is sometimes referred to as De-Modulation RS or DMRS. DMRS is transmitted only when a UE is being scheduled, and is therefore only transmitted over the frequency resource assignment of data transmission. DMRS can also be applied in uplink transmission (PUSCH), in case a UE transmitter is equipped with multiple antennas. An RS may also be transmitted for other purposes, such as channel sounding (SRS), synchronization, or any other purpose. Also note that the Reference Signal (RS) can be sometimes called the pilot signal, or the training signal, or any other equivalent term.

The LTE PHY can optionally exploit multiple transceivers and antenna at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following, for example: cyclic delay diversity (CDD) precoding methods: zero-delay, small-delay, or large-delay CDD. Spatial multiplexing may also be referred to as MIMO (multiple input multiple output).

With MRC, a signal is received via two (or more) separate antenna/transceiver pairs. The antennas are physically separated, and therefore have distinct channel impulse responses. Channel compensation is applied to each received signal within the baseband processor before being linearly combined to create a single composite received signal. When combined in this manner, the received signals add coherently within the baseband processor. However, the thermal noise from each transceiver is uncorrelated, resulting in improved signal to noise ratio (SNR). MRC enhances link reliability, but it does not increase the nominal maximum system data rate since data is transmitted by a single antenna and is processed at the receiver via two or more receivers.

MIMO, on the other hand, does increase system data rates. This is achieved by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna. While one transmitter antenna is sending the reference signal, the other antenna is idle on the same time/frequency resources. Once the channel impulse responses are known, data can be transmitted from both antennas simultaneously. The linear combination of the two data streams at the two receiver antennas results in a set of two equations and two unknowns, which are resolvable into the two original data streams.

Physical channels are mapped to specific transport channels. Transport channels are service access points (SAPs) for higher layers. Each physical channel has defined algorithms for bit scrambling, modulation, layer mapping, precoding, and resource assignment. Layer mapping and precoding are related to MIMO applications. Basically, a layer corresponds to a spatial multiplexing channel. Channel rank can vary from one up to the minimum of number of transmit and receive antennas. For example, given a 4×2 system, i.e., a system having four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving to use as many layers as the channel rank. Layer mapping specifies exactly how the extra transmitter antennas are employed. For non-codebook based precoding, the precoding applied for the demodulation reference signal (DMRS) is the same as the one applied for the PUSCH (for uplink) and PDSCH (for downlink). Multiplexing of the demodulation reference signals can be time-division multiplexing, frequency division multiplexing, code division multiplexing or a combination of them.

Precoding is used in conjunction with spatial multiplexing. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel based on a certain selection criterion. Some examples of selection criterion include average throughput and maximum signal-to-interference-noise ratio (SINR). Sequences of symbol vectors thus form a set of parallel symbol streams and each such symbol stream is referred to as a "layer". Thus, depending on the choice of precoder in a particular implementation, a layer may directly correspond to a certain physical antenna or a layer may, via the precoder mapping, be distributed onto several physical antennas.

In LTE Rel-8, single layer beamforming on antenna port 5 is already supported. Single-layer beamforming is based on non-codebook precoding and relies on a dedicated demodulation reference symbol (DMRS) for data demodulation. DMRS symbols are precoded with the same precoding matrices as the PDSCH data symbols and therefore enable UE to estimate the "effective" channel after precoding. Rank-1 transmission is enforced. A UE is restricted to receive a single transport block (codeword) which is mapped to one layer (data stream) in DL transmission. From the UE's perspective, the effective 1-layer channel appears as if data is transmitted from a single virtual antenna. DMRS corresponding to this layer is defined as antenna port 5 in LTE Rel-8 to enable channel estimation.

A very simple multi-user MIMO (MU-MIMO) scheme is currently supported in 3GPP LTE Rel-8 specification. A higher-layer configured semi-static MU-MIMO mode is configured so that a UE knows that the eNB will attempt to schedule it with one or multiple other UEs. Codebook-based precoding is used where the precoding matrices for a UE are selected from a pre-defined set (i.e. codebook) of fixed matrices (i.e. precoding matrices/vectors). CQI feedback is important for informing the DL channel status to the eNB in order to perform accurate DL link adaptation (e.g. rank, precoding matrices, modulation and coding schemes, frequency-selective scheduling) and UE scheduling. Since a UE does not know which other UEs it will be scheduled together and what precoding matrices will be used for the co-schedule UE, CQI feedback in Rel-8 is based on single-user MIMO (SU-MIMO) precoding.

3GPPs Organizational Partners have agreed to widen 3GPP's scope to include the development of systems beyond 3G Release 8/9. One of the key features of Release 10 will be enhanced peak data rates to support advanced services and applications: 100 Mbit/s for high and 1 Gbit/s for low mobility.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
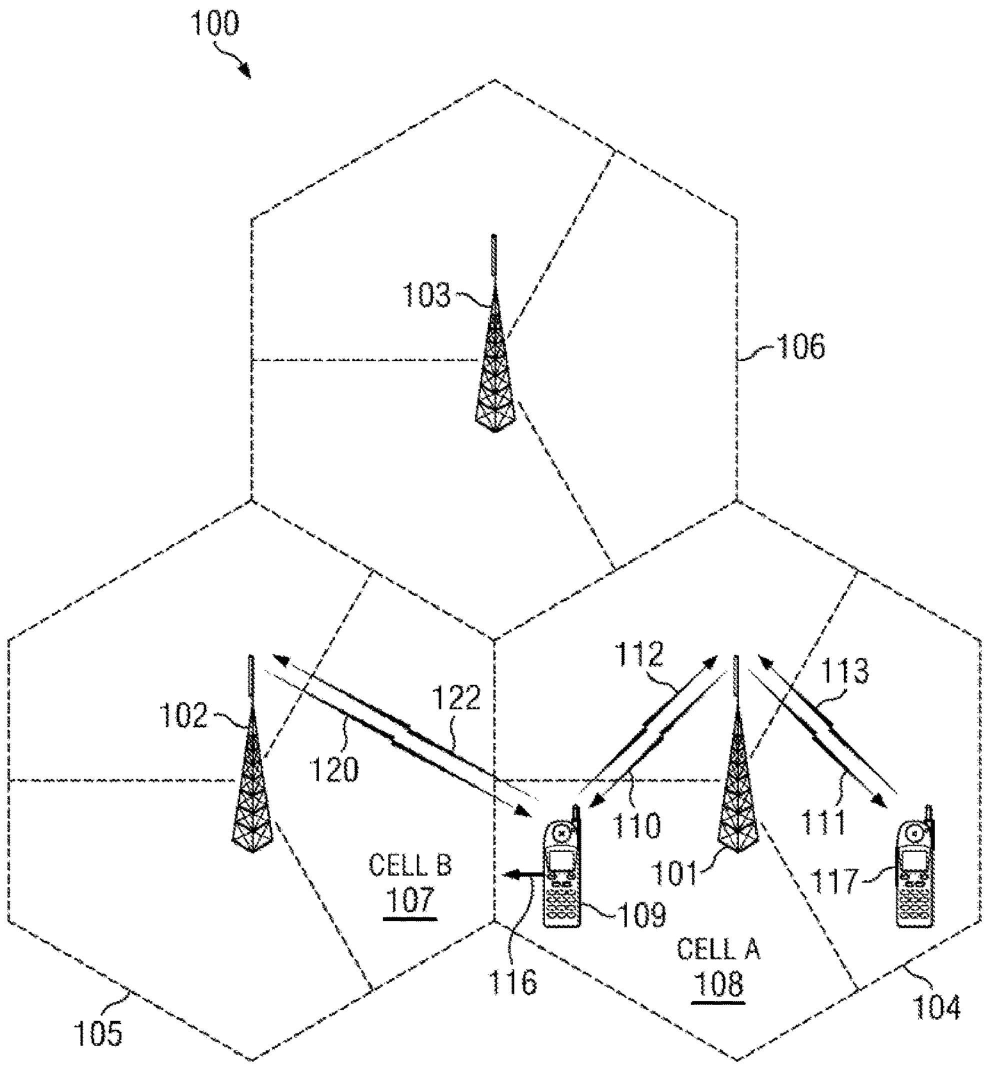
FIG. 1 is a pictorial of an illustrative telecommunications network in which an embodiment of the invention is used to provide channel state information (CSI) for multiple downlink component carriers for MIMO transmission signals.

Carrier aggregation allows concurrent transmission on multiple component carriers (CC) to increase the data rate. The aggregated CCs can be contiguous or non-contiguous in the same radio frequency (RF) band, or they may be located in different RF bands. UE feedback is important to report downlink channel state information (CSI) to the eNB to enable closed-loop MIMO beamforming and frequency-selective scheduling. For Rel-8/9 systems CSI feedback can be periodic on PUCCH and aperiodic on PUSCH. To maintain the single carrier property, periodic CSI is transmitted on the PUSCH when an UL grant coincides in the same subframe with a periodic CSI report. On the other hand, aperiodic CSI feedback on PUSCH is triggered by setting the (1-bit) CQI request field to "1" in the UL grant. Furthermore, aperiodic CSI can be transmitted on the PUSCH with or without UL-SCH data. In general, Rel-10 systems require higher CSI feedback accuracy, and larger CSI feedback payload to accommodate CSI reporting for multiple DL CCs. Therefore, aperiodic CSI transmission is considered important in Rel-10 to fully reap the performance gain promised by Rel-10 features including carrier aggregation and enhanced DL MIMO (8Tx SU-MIMO and MU-MIMO).

Several embodiments for improved CSI feedback on the PUSCH are described in this disclosure. Feedback schemes to support periodic/aperiodic CSI feedback for up to five DL component carriers on the physical uplink shared channel (PUSCH) will be described herein.

For best operation, a transmitter must have knowledge of the channel, which is provided by the UE on the uplink control channel. This process is generally referred to as channel state information (CSI) feedback. This knowledge may include a channel quality index (CQI), a precoding matrix Indicator (PMI), and a rank indication (RI). CSI feedback (RI/PMI/CQI) are recommended MIMO transmission properties derived at the UE based on the channel estimation. For example, RI is the recommended number of transmission layers (rank). PMI reflects the recommended precoding matrices within the recommended rank (RI). CQI is the observed channel quality indicator (e.g. recommended modulate and coding scheme) assuming that the RI/PMI feedback are used for MIMO precoding. The PMI feedback uses a codebook approach to provide an index into a predetermined set of precoding matrices. For 2×2 MIMO, there may be three different codewords for rank-2 precoding, and four different codewords for rank-1 precoding; for 4×2 there may be 16 codewords for rank-1 and rank-2, respectively. Since the channel is continually changing, sub-band CQI and PMI information may be provided for multiple points across the channel bandwidth, at regular time intervals, up to several hundred times a second. The RI is typically provided at a much lower rate on a wideband basis.

A downlink multiuser MIMO (DL MU-MIMO) communication system involves a single eNB transmitting to multiple UEs at the same time over the same frequency bandwidth. One example of DL MU-MIMO scheme is the dirty-paper coding approach, which from the information theory perspective is the optimal MU-MIMO scheme in terms of achieving the maximum sum capacity. An alternative and more practical MU-MIMO scheme is transmit precoding, where the data to each UE is multiplied to a UE-specific precoding matrix and then transmitted at the eNB antenna array simultaneously.

A UE that can best estimate channel conditions and then signal the best coding to use will get the best performance out of the channel. Although the use of a codebook for precoding limits the best fit to the channel, it significantly simplifies the channel estimation process by the UE and the amount of uplink signaling needed to convey the desired precoding.

The general procedure for determining and specifying CQI and PMI is defined in the EUTRA specifications, for example: "3$^{rd}$ Generation Partnership Project; Technical Specification Group Radio Access Network; Evolved Universal Terrestrial Radio Access (E-UTRA); Physical layer procedures (TS 36.213 Release 8, or later)," which is incorporated by reference herein.

FIG. 1 is a pictorial of an illustrative telecommunications network 100 in which an embodiment of the invention is used to support single user and multiuser MIMO transmission signals, as described in more detail below. The illustrative telecommunications network includes eNBs 101, 102, and 103, though in operation, a telecommunications network may include many more eNBs or fewer eNBs. Each of eNB 101, 102, and 103 is operable over corresponding coverage areas 104, 105, and 106. Each eNB's coverage area is further divided into cells. In the illustrated network, each eNB's coverage area is divided into three cells. Handset or other UE 109 is shown in Cell A 108, which is within coverage area 104 of eNB 101. Transmission is occurring between eNB 101 and UE 109 via downlink channel 110 and uplink channel 112. As UE 109 moves 116 out of Cell A 108, and into Cell B 107, UE 109 may be "handed over" to eNB 102.

When UE 109 is not up-link synchronized with eNB 101, non-synchronized UE 109 employs non-synchronous random access (NSRA) to request allocation of up-link 112 time or frequency or code resources. If UE 109 has data ready for transmission, for example, traffic data, measurements report, tracking area update, etc., UE 109 can transmit a random access signal on up-link 112 to eNB 101. The random access signal notifies eNB 101 that UE 109 requires up-link resources to transmit the UE's data. ENB 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by eNB 101, UE 109 may adjust its transmit timing, to bring the UE 109 into synchronization with eNB 101, and transmit the data on up-link 112 employing the allotted resources during the prescribed time interval. eNB 101 also sends a downlink grant to UE 109 when the eNB has data to transmit to UE 109. The downlink grant specifies one or more resource blocks on which the eNB will transmit to the UE on downlink 110.

Similarly, UE 117 may communicate with eNB 101 on downlink 111 and uplink 113. eNB 101 may decide to send data on DL 111 in SU-MIMO transmission to UE 117. Alternatively, eNB 101 may decide to send data on DL 110 to UE 109 and on DL 111 to UE 117 in MU-MIMO transmission using the same frequency resources, as will be described in more detail below. In either case, an improved scheme for providing CSI reports indicative of aggregated component carriers (CC) is embodied in each UE and used by the eNB for improved scheduling and downlink data transmission, as will be described in more detail below.

Implicit Channel State Information (CSI) Feedback

With spatial multiplexing, a base station (Evolved Universal Terrestrial Radio Access Node B or eNB) may send multiple data streams (or layers) to UEs in downlink transmission using the same frequency. The number of such layers or streams is defined as the rank. For LTE Rel-8, a UE needs to estimate the DL channel and report the recommended rank indicator (RI) to the serving eNB. The UE also must report the channel quality indicator (CQI) and the precoding matrix indicator (PMI) which is an index to the precoding matrix in a codebook. These indicators form a set of recommended transmission property to the serving eNB. Upon receiving this feedback from the UE (RI/PMI/CQI), the eNB performs corresponding downlink MIMO transmission scheduling.

Implicit CSI (CQI/PMI/RI) feedback are based on a pre-defined set of codebooks, which are a set of matrices calculated offline and known at the eNB and UE. Codebook of rank-r consists of a number of Nt×r matrices where Nt is the number of eNB transmit antennas. UE feedback includes the following information:

- Rank indicator (RI): number of data stream;
- Precoding matrix indictor (PMI): the index of the UE recommended precoding matrix in the rank-r codebook. For E-UTRA LTE Rel-8, a single PMI is reported for each frequency subband, corresponding to the RI report; and
- Channel quality indicator (CQI): quality of the channel (e.g. in the form of supportable data rate, SNR). The reported CQI is associated with the reported PMI.

Figure 2:
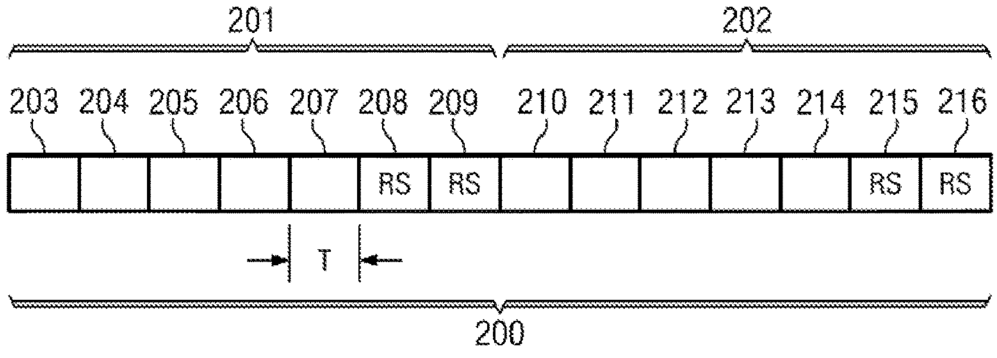
FIG. 2 is an illustrative format of one subcarrier (tone) of a DL transmission subframe for use in the network of FIG. 1.

FIG. 2 is an illustrative format of one subcarrier (tone) of a DL transmission subframe for use in the network of FIG. 1. It includes 14 resource elements. Elements of the present invention will be described in the context of EUTRA sub-frame, even though its applicability is broader. Orthogonal frequency division multiple access (OFDMA) based systems include classic OFDMA as well as its alternatives, like single carrier frequency division multiple access (SC-FDMA) and discrete Fourier transform (DFT)-spread OFDMA. In OFDMA based systems, frequency resources are divided into tones. Tones are further grouped into "tone blocks" or "resource blocks" for purposes of frequency-dependent scheduling of mobiles, and other possible purposes. Thus, each mobile can be allocated one or more resource blocks in an OFDMA based system. This group of resource blocks will be denoted as the frequency allocation for a given mobile.

FIG. 2 illustrates just one subcarrier of sub-frame 200 comprising two slots 201 and 202. It includes 14 resource elements. Duration of the EUTRA sub-frame is 1 ms, which means that duration of two slots 201 and 202 is 0.5 ms each. Each slot comprises seven OFDM symbols when a normal cyclic protection field (CP) is appended to each symbol, or six symbols when an extend CP is appended to each symbol. For example, slot 201 comprises symbols 203-209. The slot 202 comprises symbols 210-216. Symbols 208, 209, 215 and 216 are Demodulation (DM) Reference symbols (RS), and are used to derive channel estimates which are needed for coherent demodulation of the remaining symbols that are modulated with payload data. LTE Rel 9 also defines several other antenna port configurations for antenna ports 0-3 and 5, where port 0-3 are unprecoded cell-specific reference symbols (CRS) antenna ports and port 5 is DMRS for single-layer data transmission defined in Rel-8. Each symbol has a time duration equal to approximately T, which is a function of the slot time. In this embodiment, the slot time is 500 μsec. Since the first symbol in the slot has more cyclic prefix samples, not all symbols are exactly equal in duration, as per 3GPP TS36.211. Nevertheless, all symbols can be considered to be approximately equal in duration, which doesn't exceed 75 μsec. Note that if all symbols were exactly equal in duration, the symbol time T would approximately be equal to 500 μsec/7=71.4 μsec.

In some embodiments of the invention, the set of reference signal sequences comprises CAZAC sequences and near-CAZAC sequences. Near-CAZAC is a term which designates sequences which are obtained using computer search methods, and whose properties approximate CAZAC properties. In some embodiments of the invention, CAZAC sequences are Zadoff-Chu sequences. In some embodiments of the invention, near-CAZAC sequences are sequences of the form $\exp(j*\pi*\varphi(n)/4)$; wherein the length of $\varphi(n)$ is an integral multiple of 12. Here, "j" is the imaginary unit.

In some embodiments of the invention, the set of reference signal sequences comprises CAZAC sequences only. In some embodiments of the invention, the set of reference signal sequences comprises near-CAZAC sequences only. In some embodiments of the invention, the set of reference signal sequences comprises both CAZAC sequences and near-CAZAC sequences. Sometimes, a phase ramp is applied to modify the first sequence, for example $\exp(j*n*\alpha+j*r*\varphi(n)/4)$ can still be considered as a reference signal sequence. For 3GPP EUTRA, there are 30 possible sequences of length 24, which are also near-CAZAC. For length 36 and more, sequences are produced from CAZAC sequences. Thus, the set of reference signal sequences comprises both CAZAC and near-CAZAC sequences.

Further details on the construction of reference signals, demodulation reference signals and sounding reference signals are included in 3rd Generation Partnership Project; GPP TS 36.211 V9.1.0 (2010) "Technical Specification Group Radio Access Network; Evolved Universal Terrestrial Radio Access (E-UTRA); Physical Channels and Modulation," in particular in section 6 and which is incorporated herein by reference.

As mentioned earlier, carrier aggregation allows concurrent transmission on multiple component carriers to increase the data rate. The aggregated CCs can be contiguous or non-contiguous in the same RF band, or they may be located in different RF bands. UE feedback is important to report downlink channel state information to the eNB to enable closed-loop MIMO beamforming and frequency-selective scheduling. For Rel-8/9 systems CSI feedback can be periodic on PUCCH and aperiodic on PUSCH. To maintain the single carrier property periodic CSI is transmitted on the PUSCH when an UL grant coincides in the same subframe with a periodic CSI report. On the other hand aperiodic CSI feedback on PUSCH is triggered by setting the (1-bit) CQI request field to "1" in the UL grant. Furthermore, aperiodic CSI can be transmitted on the PUSCH with or without UL-SCH data. In general, Rel-10 systems require higher CSI feedback accuracy, and larger CSI feedback payload to accommodate CSI reporting for multiple DL CCs. Therefore, aperiodic CSI transmission is considered important in Rel-10 to fully reap the performance gain promised by Rel-10 features including carrier aggregation and enhanced DL MIMO (8Tx SU-MIMO and MU-MIMO). Several design choices for CSI feedback on the PUSCH will now be described.

Terminology

PCC: primary component carrier, it is always present for a UE. For the purpose of data transmission and reception by a UE it is also denoted as the primary serving cell (PCell).

SCC: secondary component carrier, the UE can be configured for one or more SCC. For the purpose of data transmission and reception by a UE it is also denoted as a secondary serving cell (SCell).

CSICC: the downlink CC whose CSI is reported $$N_{CC}^{DL}:$$

the number of DL CCs (or DL serving cells) that are configured for a specific UE.

Aperiodic CSI Feedback

It has been agreed that only one PUSCH carries UCI (uplink control information) in the case of carrier aggregation. Therefore one UL grant may trigger CSI feedback for several (N) DL CCs, with several possibilities:

Case 1: N=1: one UL grant triggers CSI feedback for one DL CC.

Case 2:

$$N = N_{CC}^{DL}:$$

one UL grant triggers CSI feedback for all $$N_{CC}^{DL}$$

CCs.

Case 3:

$$N \in [1, N_{CC}^{DL}]$$

is configurable

In the following sub-sections the need and required signaling for each case will be discussed. Embodiments of the invention provide methods and configurations that define the following criteria: 1) how to indicate the desired CSICCs, and 2) which UL CC conveys the aggregated CSI feedback in a subframe with multiple UL grants.

Case 1: N=1

Similarly to Rel-8/9, the CQI request bit in the UL DCI (downlink control information) format is used to trigger CSI feedback for one DL CC. This scheme achieves the maximum commonality with Rel-8/9 in terms of CSI multiplexing on PUSCH. Hence if CSI coding and resource dimensioning follows the same rules as in Rel-8, N=1 minimizes the specification change of the PUSCH even with the proposed Rel-10 DL MIMO double codebook structure of W1 and W2.

For a single-antenna UE this is beneficial in terms of minimizing the UE implementation impact. For a multi-antenna UE, maintaining the same PUSCH processing may be less critical because UCI multiplexing (especially RI) is different from Rel-8.

One disadvantage of Case I is the limited CSI feedback payload since an UL grant can only trigger one CC report. Therefore, CSI feedback reports for all $$N_{CC}^{DL}$$

CCs may need to be time-multiplexed. For example: CC scanning or multiple UL grants triggering multiple PUSCH. Other than the increased feedback delay and impaired CSI accuracy, the UL grant overhead increase should be taken into account. For example, if one UL grant triggers a one-shot CSI report for one DL CC, $$N_{CC}^{DL}$$

grants are needed to trigger CSI for $$N_{CC}^{DL}$$

DL CCs. Alternatively, one UL grant may trigger a block of periodic CSI reporting on PUSCH for multiple DL CCs, which comprises M cycles of PUSCH report where each cycle includes $$N_{CC}^{DL}$$

Figure 3:
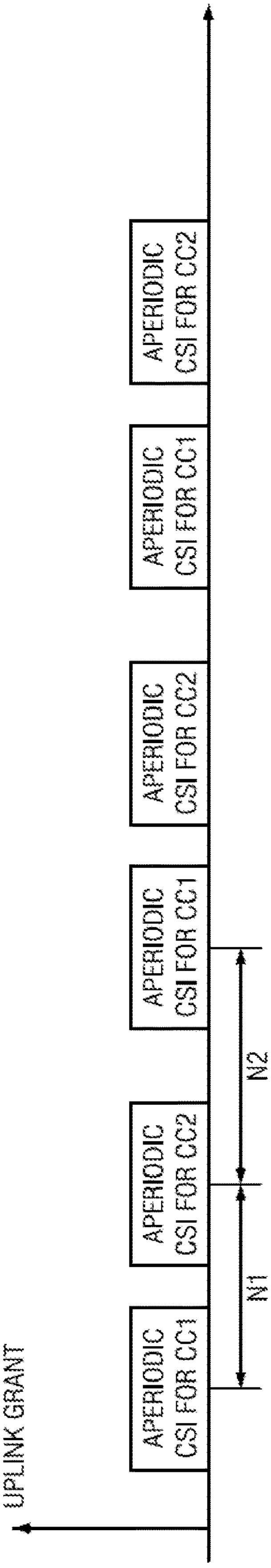
FIG. 3 illustrates aperiodic triggering of three cycles of CSI feedback from two DL CCs.

PUSCH transmissions with a periodicity of N1 subframes, and different cycles have a time-domain offset of N2 subframes. An example is given in FIG. 3, which illustrates aperiodic triggering of three cycles of CSI feedback from two DL CCs, where $$N_{CC}^{DL} = 2, M = 3.$$

The second issue is how to signal which DL CC a PUSCH report is targeting. This can be done in a number of ways. A first option is to provide CQI triggering based on the UL CC that is indicated in the system information block Type 2 configuration (SIB2-linkage). This is an implicit mapping scheme wherein the CSI report for one DL CC can only be triggered by UL grant on the same CC, i.e. DL CC=CSICC. Furthermore, the UL grant is transmitted on the SIB2-linked UL CC. For the case of cross-CC scheduling some modifications are needed for this approach. Exemplary use cases are shown in FIGS. 4A-4C with the SIB2-linkage for each DL/UL CC pair illustrated.

Figure 4A:
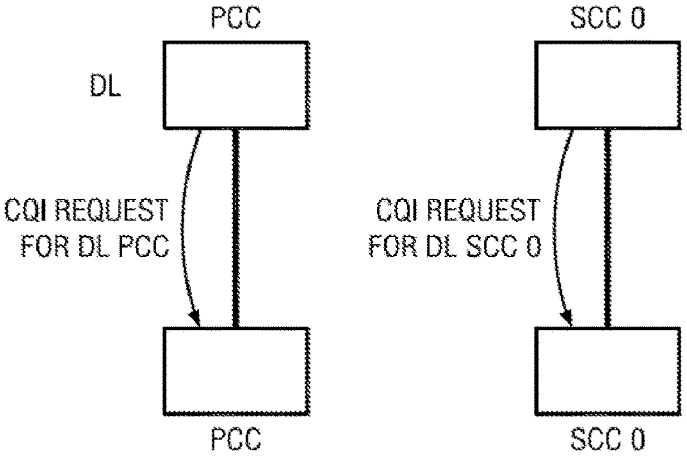
FIGS. 4A-4C illustrate cases for CQI triggering by SIB2-linkage.

FIG. 4A illustrates the case where a CQI report for a PCC that is responsible for SCC 0 can only be triggered by the UL grant conveyed on DL PCC.

Figure 4B:
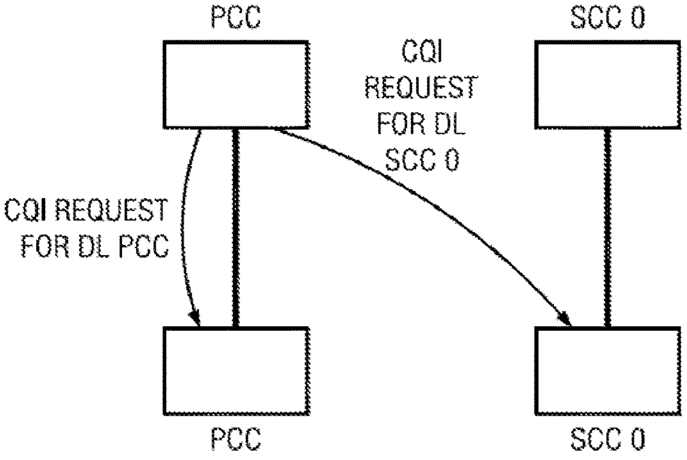

FIG. 4B illustrates the case where the UE is configured for cross-CC scheduling. The UE monitors the DL PCC for the PUSCH of the UL PCC and SCC 0. An UL grant for UL PCC triggers a CQI report for the DL PCC. An UL grant for UL SCC 0 triggers a CQI report for DL SCC 0.

Figure 4C:
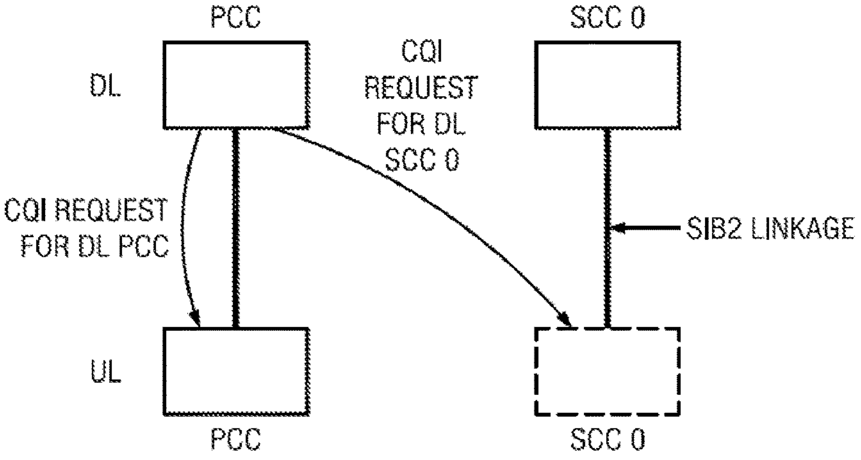

FIG. 4C illustrates the asymmetric CA case where the UE is not configured for UL SCC 0, as indicated by the dashed line. To request CQI report for DL SCC 0, cross-CC scheduling is enabled for SCC1 even though it is not configured for the UE. A carrier indication field (CIF) is added to the UL DCI format for this purpose. In accordance with a RAN2 agreement that an UL grant on DL SCC 0 is ignored by the UE, a CQI request is sent on DL PCC with a CIF value indicating UL SCC 0. Since the UE is not configured to transmit on UL SCC 0 the UE interprets this DCI as a request for a CQI report from DL SCC 0, and this CQI report is sent on the UL PCC.

This is a different way of exploiting the CIF field for aperiodic CQI requests. An advantage is that it avoids adding a new bit field to DCI format 0 for aperiodic CQI request. Note that it does not violate the agreement that a UE only monitors the PDCCH on 1 CC for the PUSCH on a configured UL CC. It should be clear that this option is not needed for TDD due to symmetric CA.

This scheme produces less impact on UL grant and 1-bit CSI triggering can be reused. However, this scheme produces a feedback restriction with unbalanced CSI feedback among CCs. A UE may be configured to monitor UL grant only in one DL CC semi-statically. Given such a restriction, the CSI report will be limited to a single DL CC semis-statically, and UE will not be able to feedback CSI for other CCs until the eNB reconfigures the PDCCH monitoring CC.

A second option for signaling which DL CC a PUSCH report is targeting is to perform CSI scanning. This is an implicit mapping scheme wherein one UL grant triggers consecutive CSI report that scans through all DL CCs, on a periodic basis. A timer needs to be synchronously known at the eNB and UE to understand the CSICC index, e.g. based on the system frame number (SFN).

A third option for signaling which DL CC a PUSCH report is targeting is to perform explicit mapping. An m-bit CSICC field $$\left(m = \log 2\left(N_{CC}^{DL}\right)\right)$$

may be used to indicate which CSICC that is conveyed on the PUSCH. Alternatively, a fixed 3-bit CSICC field may be used.

A fourth option for signaling which DL CC a PUSCH report is targeting is to perform explicit mapping in which the CSICC field is jointly encoded with the 1-bit CQI triggering. In this case, $$m = \log 2\left(N_{CC}^{DL} + 1\right)$$

bits are needed to jointly indicate the CSI triggering and the CSICC index.

Options 3 and 4 have the obvious disadvantage of increased UL grant payload, but only a maximum 3-bits A fifth option for signaling which DL CC a PUSCH report is targeting is to perform CSI triggering using virtual UL grant. This scheme is a derivative of the implicit triggering approach of Option 1, wherein a positive CSI request is transmitted in a PDCCH on the CC for which an aperiodic CSI report is required. For the asymmetric case shown in FIG. 4C, the UE monitors DCI format 0 on DL SCC 0. Although this is not in line with the RAN2 agreement, in any case the UE has to monitor DCI Format 1A on DL SCC 0. Therefore, there is no savings in number of blind decodes by not monitoring DCI format 0 since blind decoding is jointly performed for both DCI formats 0 and 1A.

In this scheme, a CSI report for DL SCC 0 is transmitted by a virtual UL grant on DL SCC 0. This UL grant is defined as a virtual UL grant since UL SCC 0 is not configured and the UE is not configured for cross-CC scheduling on DL SCC 0. A companion UL grant must be simultaneously sent on another DL CC for which the SIB2-linked UL CC is configured for the UE. For example, in FIG. 4C a companion UL grant is sent on the PCC. If a positive CSI request is detected on the companion UL grant and the virtual UL grant, then the UE concatenates aperiodic CSI reports for both DL CCs on the PUSCH indicated by the companion UL grant. If a positive CSI request is on the virtual UL grant and no CSI request is detected on the companion UL grant, then the UE transmits aperiodic CSI report for the DL CC indicated by the virtual UL grant.

Case 2:

$$N = N_{CC}^{DL}:$$

One UL Grant Triggers CSI Feedback for all $$N_{CC}^{DL}$$

CCs.

In this case, one PUSCH carries CSI for all DL CCs. The 1-bit CSI triggering in the uplink grant, if enabled, triggers concurrent CSI report for all DL CCs on the PUSCH. This design has almost no impact on the UL grant, and the same DCI format can be re-used regardless of carrier aggregation. On the other hand, a larger CSI payload than Rel-8 is present whenever CSI report is triggered. Note that the maximum CSI payload for one DL CC in Rel-8 is around 100 bits (mode 3-1 with wideband RI/PMI and subband CQI). The DL MIMO double-codebook structure in Rel-10 should not significantly increase the CSI payload (per CC) because the inner codebook (W1) is wideband and incurs marginal CSI overhead. Hence, assuming the outer codebook (W2) is not significantly larger than the Rel-8 codebook, the total CSI is approximately 100 bits for one CC and 500 bits for five CC. The eNB may simply allocate a larger frequency assignment on PUSCH to accommodate the increased CSI payload.

Case 3:

$$N \in \left[1, N_{CC}^{DL}\right]$$

is Configurable

The rel-8/9 1-bit CQI request field is extended to a bit map of $$N_{CC}^{DL}$$

bits wherein a “1” in position x indicates a CQI request for DL CC x and a “0” in position x indicates there is no CQI request for DL CC x. For simplicity, the first bit position (MSB) may represent the PCC while the other bit positions may represent the other SCCs in increasing frequency. However, other bit mappings are not precluded, such as a bit mapping based on the serving cell index.

Figure 5:
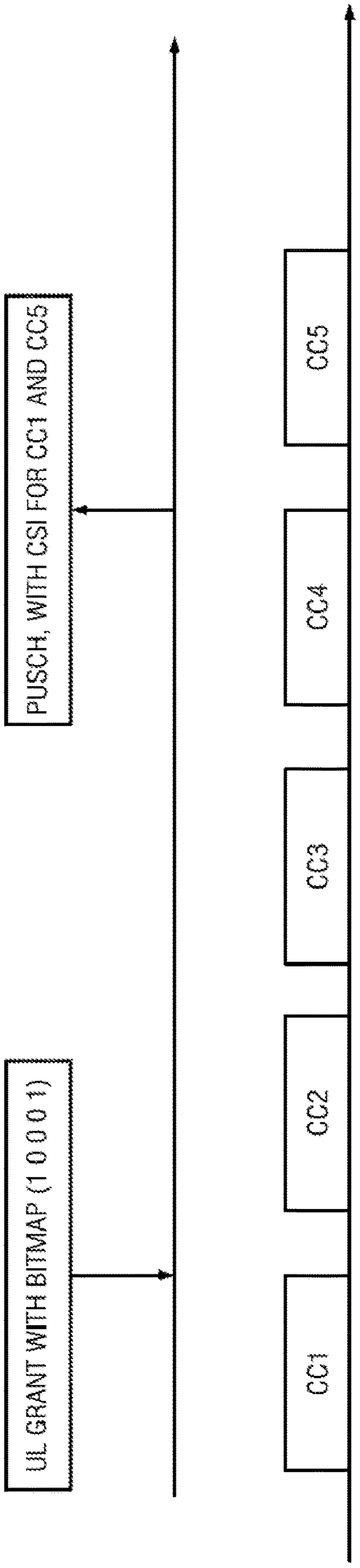
FIG. 5 illustrates triggering aperiodic CSI reports from a subset of five DL CCs using a bitmap.

To avoid ambiguity, during CC activation/deactivation the size of the bit map can be set to the number of configured DL CCs. An illustration is shown in FIG. 5 for five DL CCs with a CSI feedback for CC1 and CC5 using a bitmap.

Allowing a variable set of CCs for aperiodic report has several advantages. CSI feedback delay is reduced and CSI accuracy/granularity is improved. Differentiated CSI reporting for different DL CCs is allowed according to the system operation (e.g. buffer status, cell load), where eNB may configure CSI report for each DL CC on a need basis. For example if the downlink data traffic is low, eNB only needs to schedule UE on a few CCs. In this case the UL grant can trigger CSI for one or two DLCC that historically has good channel conditions because they are more likely to be used for DL PDSCH transmission. Other CCs that have poorer CSI history can be omitted in CSI report since they are less likely used.

CSI payload on PUSCH may be adaptively configured. UE does not need to always report CSI for all CCs unless it is considered necessary by the eNB.

Such configurability may prove to be beneficial for heterogeneous deployment scenario. In case one CC experiences high interference from Femto cell (e.g. due to traffic offloading), the eNB may trigger fewer aperiodic CSI reports on the highly interfered CC while requesting more frequent CSI reports from other CCs.

Similar alternatives, wherein a bitmap is used to configure CSI reporting are not precluded. One alternative is medium access control (MAC) signaling in which the bitmap is configured by MAC signaling. This method solves the issue of the UL grant overhead by (re)configuring the number of DL CCs that are indicated by one aperiodic CSI request. It trades off the L1 overhead of a CSI request bit map in the UL grant with increased latency of bit map (re)configuration. The bit map can be placed in a MAC control element which is conveyed in a PDSCH.

A second alternative for using a bitmap to configure CSI reporting is RRC signaling. This method is the most reliable compared to L1 and L2 signaling but it also incurs the most latency in bitmap (re)configuration. The UE is configured by RRC signaling with a bitmap which specifies the subset of the configured DL CCs that CSI should be reported for. When the UE detects a positive CSI request in a PDCCH on any of the CSI-CCs in the configured subset, then the UE reports CSI for the CSI-CCs enabled in the bitmap.

Allowing a variable set of CCs for aperiodic report has some drawbacks. One drawback is increased UL grant overhead that scales linearly with the number of configured DL carriers. For example, if five DL CCs are configured, a 5-bit map is required in the UL grant. However, carrier aggregation of up to five downlink carriers may be a rare case, and a smaller number of carrier aggregation (2-3) represents most of the predominant use cases. Hence, the differentiated CSI reporting flexibility for different CCs and lower PUSCH overhead appears much more critical.

The overhead of the bitmap may be reduced by grouping the $$N_{CC}^{DL}$$

CCs into subsets with similar properties such as interference condition, such as in heterogeneous network (HetNet) environments. For example, a 2-bit CSI triggering field in the UL grant can be used to signal up to three groupings. One exemplary configuration is as follows:

"00" indicates no CSI is triggered

"01" triggers the SIB2-linked DL CC

"10" triggers an RRC configured subset of the activated DL CCs

"11" triggers all activated CCs

Alternatively, "11" can also trigger another RRC-configured subset.

Note that for the case of at most two DL CCs in Rel-10 the 2-bit field provides full flexibility as follows:

"00" indicates no CSI is triggered

"01" triggers the SIB2-linked DL CC

"10" triggers the other DL CC

"11" triggers both CCs

UL CC Indication

It is natural for the CSI to be conveyed on the CC which is scheduled by the UL grant. However, if aperiodic CQI requests are triggered in multiple UL grants, the UE needs to be signaled which UL CC conveys the CSI, per the 3GPP RAN1 agreement that UCI is transmitted on only one PUSCH. There are two basic options, as follows:

Option 1: reuse the CC priority rules for periodic CSI transmission for aperiodic CSI transmission.

Option 2: if the UE receives multiple UL grants only one UL grant can contain a positive CSI request.

Option 2 is preferred because it simplifies specification and testing efforts. On the other hand an ambiguous scenario could occur where the UE detects two or more UL grants with positive CSI request. This case can be viewed as either a faulty eNB implementation or a PDCCH decoding error by the UE. Since either case should almost never occur, the UE behavior may be left undefined for this scenario.

Aperiodic CSI Transmission without UL-SCH Data

Rel-8/9 supports CSI-only transmission on PUSCH by setting the CQI request bit to "1", the modulation and coding set index $I_{MCS}$=29 and the number of PRBs in the UL grant $N_{PRB}\leq 4$ in DCI format 0. Some modification is required to support CSI reporting of up to five DL CCs on the PUSCH without associated UL-SCH data. At the very least, $N_{PRB}$ must be increased.

One scheme for aperiodic CSI transmission without UL-SCH data for CSI feedback for $$N \leq N_{CC}^{DL}$$

CCs is to set CQI request bit to trigger CSI reports for multiple CCs, $I_{MCS}$=29 and $N_{PRB}\leq L$. To reduce error cases L should only scale with $$N_{CC}^{DL}$$

or with the number of configured DL CCs, i.e. L should not change depending on how many CSI reports are included in particular transmission.

A second scheme is to restrict aperiodic CQI request without UL-SCH data to the Rel-8/9 procedure. This implies that an aperiodic CQI request from multiple DL CCs cannot occur without UL-SCH data. The eNB simply determines the appropriate RB allocation to account for the aggregate CSI transmission with an appropriate amount of UL-SCH data. The size of the transport block for UL-SCH data is left to eNB implementation. Therefore, for the case where CQI request bit="1", $I_{MCS}$=29 and $N_{PRB}$≤4, there is only one CSICC, and the UE reports the CQI for the DL CC conveying the UL grant.

Figure 6:
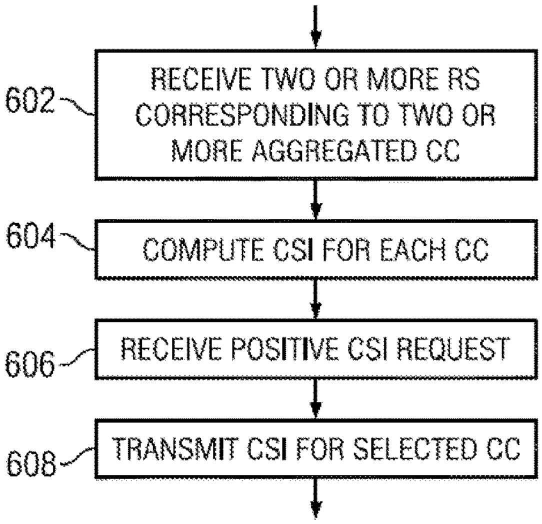
FIG. 6 is a flow chart illustrating operation of CSI reporting used in the network of FIG. 1.

FIG. 6 is a flow chart illustrating operation of UE and eNB in the network of FIG. 1 while reporting CSI for aggregated CCs. A UE, such as UE 109, receives 602 two or more reference signals corresponding to two or more aggregated component carriers (CC) at the user equipment from a base station, such as eNB 101. The aggregated CCs are scheduled by the eNB according to LTE standards. Reference signals are transmitted by the eNB to the UE as described in more detail above.

The UE computes 604 a set of channel state information (CSI) estimates derived from the two or more reference signals corresponding to the two or more CCs. The CSI is computed using known techniques according to LTE standards.

The UE receives 606 a positive CSI request from the eNB for a CSI report and in response transmits 608 CSI feedback from the UE to the eNB comprising one or more CSI reports selected from the plurality of CSI estimates.

The UE may also receive 606 with the CSI request a bit map from the eNB that specifies a subset of the two or more CCs. The bit map may be explicit, or it may be encoded. The CSI that is transmitted 608 to the base station contains CSI reports for the CCs specified by the bit map.

The UE may receive 606 a plurality of uplink grants from the eNB for the two or more aggregated component carriers. The positive CSI request is contained within only one of the plurality of uplink grants from the eNB.

System Example

Figure 7:
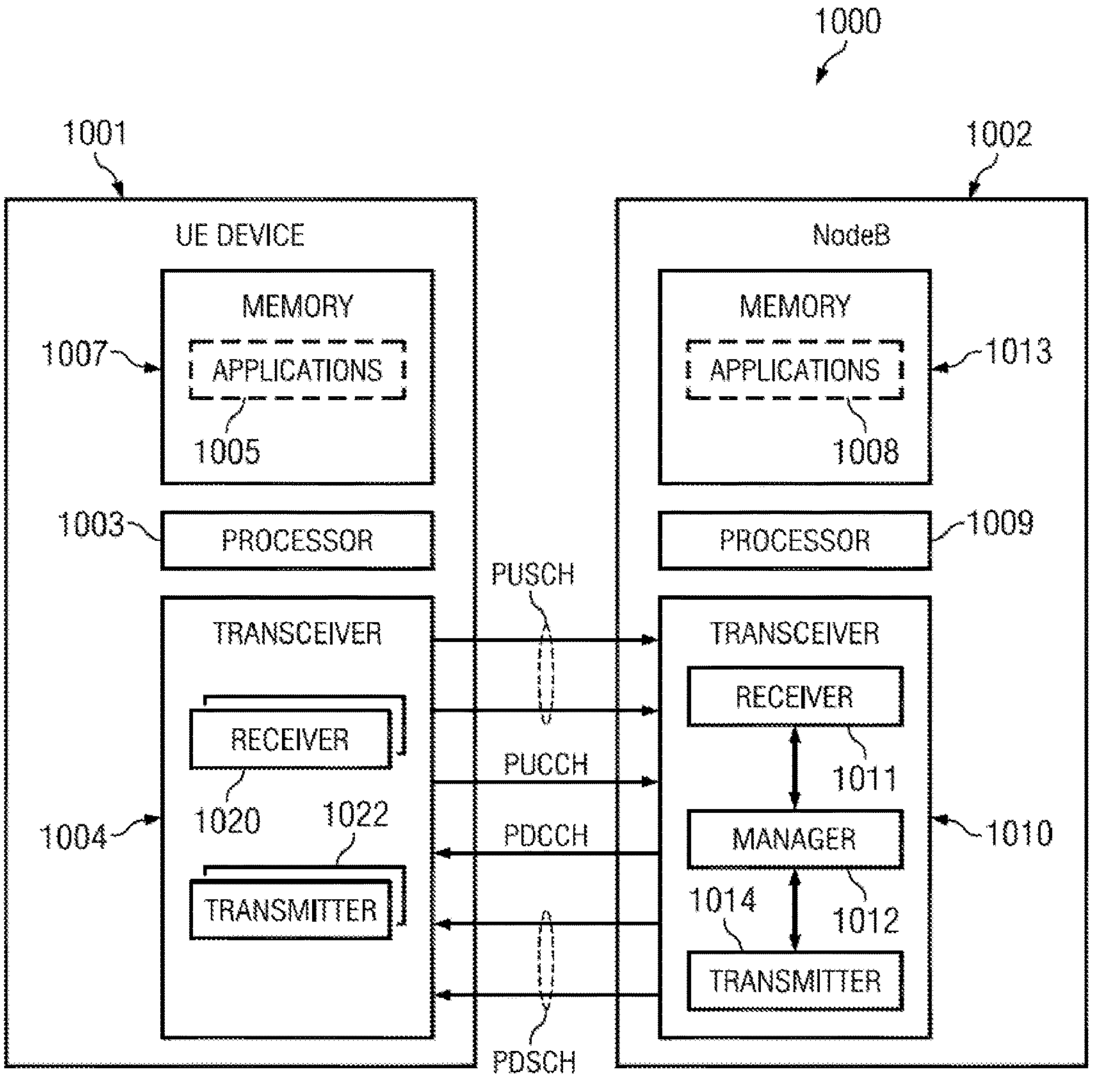
FIG. 7 is a block diagram illustrating an exemplary portion of a cellular network with a base station in communication with a mobile device.

FIG. 7 is a block diagram illustrating an exemplary portion of the cellular network of FIG. 1. As shown in FIG. 7, the wireless networking system 1000 includes a UE device 1001 in communication with an eNB 1002. The UE device 1001 may represent any of a variety of devices such as a server, a desktop computer, a laptop computer, a cellular phone, a Personal Digital Assistant (PDA), a smart phone or other electronic devices. In some embodiments, the electronic UE device 1001 communicates with the eNB 1002 based on a LTE or E-UTRA protocol. Alternatively, another communication protocol now known or later developed may be used.

As shown, UE device 1001 includes a processor 1003 coupled to a memory 1007 and a Transceiver 1004. The memory 1007 stores (software) applications 1005 for execution by the processor 1003. The applications 1005 could be any known or future application useful for individuals or organizations. As an example, such applications 1005 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1005, at least some of the applications 1005 may direct eNB (base-station) 1002 to transmit DL signals to UE device 1001 periodically or continuously via the transceiver 1004.

Transceiver 1004 includes uplink logic which may be implemented by execution of instructions that control the operation of the transceiver. Some of these instructions may be stored in memory 1007 and executed when needed. As would be understood by one of skill in the art, the components of the uplink and downlink logic may involve the physical (PHY) layer and/or the Media Access Control (MAC) layer of the transceiver 1004. Transceiver 1004 includes two or more receivers 1020 and two or more transmitters 1022 for SU/MU-MIMO, as described in more detail above.

eNB 1002 includes a Processor 1009 coupled to a memory 1013 and a transceiver 1010. Memory 1013 stores applications 1008 for execution by the processor 1009. The applications 1008 could be any known or future application useful for managing wireless communications. At least some of the applications 1008 may direct the base-station to manage transmissions to or from the user device 1001.

Transceiver 1010 includes a resource manager which enables eNB 1002 to selectively allocate uplink PUSCH resources and downlink PDSCH resources to the user device 1001. As would be understood by one of skill in the art, the components of the resource manager 1012 may involve the physical (PHY) layer and/or the Media Access Control (MAC) layer of the transceiver 1010. Transceiver 1010 includes a Receiver 1011 for receiving transmissions from various UE within range of the eNB and transmitter 1014 for transmission to the various UE within range. The resource manager executes instructions that control the operation of transceiver 1010. Some of these instructions may be located in memory 1013 and executed when needed. The resource manager controls the transmission resources allocated to each UE that is being served by eNB 1002 and broadcasts control information via the physical downlink control channel PDCCH.

During MIMO transmission from eNB 1002 via transmitters 1014 on PDSCH, eNB 1002 monitors channel conditions to adapt to the prevailing condition. This includes monitoring the channel quality indicator (CQI) and precoding matrix index (PMI) feedback provided by UE 1001 on the uplink channel using condition monitoring logic 1012 that is coupled to receiver 1011. As was described in more detail above, the enhanced CQI/PMI feedback includes periodic and aperiodic CSI reports for aggregated CCs.

During MIMO transmission to UE 1001 via transmitters 1014 on PDSCH, eNB 1002 forms DMRS signals, depending on the number of layers being used for transmission, as described in more detail above.

A typical eNB will have multiple sets of receivers and transmitters which operate generally as described herein to support hundreds or thousand of UE within a given cell. Each transmitter may be embodied generally by a processor 1009 that executes instructions from memory 1013 to perform the scrambling, mapping, and OFDM signal formation, using signal processing techniques as are generally known in the art along with embodiments of the invention described herein.

As described in more detail above, the eNB transmits a reference signal for reception by a UE. The eNB then receives feedback from the UE comprising periodic and aperiodic CSI reports for aggregated CCs that have been scheduled by the eNB for the UE. The eNB uses the CQI for each of the two or more ranks and the PMI included in the feedback to select a precoding matrix for use by the eNB for transmission of data to the UE in single user or in multiuser transmission modes.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While the invention has been described with reference to DL transmission, it may be equally applied to UL transmission.

Embodiments of the invention may support single user (SU) dual-layer beamforming in LTE Rel-10 for both LTE-TDD (time division duplex) and FDD (frequency division duplex) using UE specific demodulation reference signals and mapping of physical data channel to resource elements. Embodiments of the invention are also applicable to spatial multiplexing (MIMO) of up to eight layers in LTE Rel-10, and may be extended to spatial multiplexing with more than eight layers in future advanced communication systems.

The term "frame" and "subframe" are not restricted to the structure of FIG. 2. Other configurations of frames and/or subframes may be embodied. In general, the term "frame" may refer to a set of one or more subframes. A transmission instance likewise refers to a frame, subframe, or other agreed upon quantity of transmission resource.

Embodiments of this invention apply to various types of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, an embodiment of the invention may perform all tasks described herein such as channel monitoring and precoding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method comprising:

receiving two or more reference signals corresponding to two or more aggregated component carriers (CC);

receiving a bitmap via RRC signaling, the bitmap specifying a subset of the two or more aggregated CCs;

computing a plurality of channel state information (CSI) estimates derived from the two or more reference signals for each of two or more aggregated CCs;

receiving a positive CSI request for one or more CSI reports; and transmitting CSI feedback comprising one or more CSI reports for the subset of the two or more aggregated CCs specified by the bitmap, the CSI reports being determined based on the CSI estimates, wherein the CSI feedback is transmitted on a physical uplink shared channel PUSCH) indicated by $I_{MCS}$=29 and $N_{PRB}$≤L, where L is a fixed number that does not vary with $$N_{CC}^{DL},$$

where $I_{MCS}$ represents a modulation and coding scheme value, $N_{PRB}$ represents a number of allocated physical resource blocks, and $$N_{CC}^{DL}$$

represents a number of downlink component carriers, and wherein there is no associated uplink shared (UL-SCH) data on the PUSCH indicated by $I_{MCS}$=29 and $N_{PRB}$≤L.

2. The method of claim 1, further comprising receiving a plurality of uplink grants for the two or more aggregated component carriers, wherein the positive CSI request is contained within only one of the plurality of uplink grants.

3. A method comprising:

transmitting two or more reference signals corresponding to two or more aggregated component carriers (CC);

transmitting a bitmap via RRC signaling, the bitmap specifying a subset of the two or more aggregated CCs;

transmitting a positive channel state information (CSI) request for one or more CSI reports determined based on a plurality of CSI estimates derived from the two or more reference signals for each of two or more aggregated CCs; and receiving CSI feedback comprising one or more CSI reports for the subset of the two or more aggregated CCs specified by the bitmap, wherein the CSI feedback is received on a physical uplink shared channel (PUSCH) indicated by $I_{MCS}$=29 and $N_{PRB}$≤L, where L is a fixed number that does not vary with $$N_{CC}^{DL},$$

where $I_{MCS}$ represents a modulation and coding scheme value, $N_{PRB}$ represents a number of allocated physical resource blocks, and $$N_{CC}^{DL}$$

represents a number of downlink component carriers, and wherein there is no associated uplink shared (UL-SCH) data on the PUSCH indicated by $I_{MCS}$=29 and $N_{PRB}$≤L.

4. The method of claim 3, further comprising transmitting a plurality of uplink grants for the two or more aggregated component carriers, wherein the positive CSI request is contained within only one of the plurality of uplink grants.

5. A user equipment device comprising:

circuitry configured to receive two or more reference signals corresponding to two or more aggregated component carriers (CC) and to receive a bitmap via RRC signaling, the bitmap specifying a subset of the two or more aggregated CCs;

a processor configured to compute a plurality of CSI estimates derived from the two or more reference signals for each of two or more aggregated CCs;

circuitry configured to transmit channel state information (CSI) feedback comprising one or more CSI reports for the subset of the two or more aggregated CCs specified by the bitmap in response to a positive CSI request received for one or more CSI reports, the CSI reports being determined based on the CSI estimates, wherein the CSI feedback is transmitted on a physical uplink shared channel (PUSCH) indicated by $I_{MCS}$=29 and $N_{PRB}$≤L, where L is a fixed number that does not vary with $$N_{CC}^{DL},$$

where $I_{MCS}$ represents a modulation and coding scheme value, $N_{PRB}$ represents a number of allocated physical resource blocks, and $$N_{CC}^{DL}$$

represents a number of downlink component carriers, and wherein there is no associated uplink shared (UL-SCH) data on the PUSCH indicated by $I_{MCS}$=29 and $N_{PRB}$≤L.

6. The device of claim 5, wherein the processor is further configured to receive a plurality of uplink grants for the two or more aggregated component carriers, wherein the positive CSI request is contained within only one of the plurality of uplink grants.

7. A method comprising:

receiving two or more reference signals corresponding to two or more aggregated component carriers (CCs);

receiving one or more bits via RRC signaling, the one or more bits specifying a subset of the two or more aggregated CCs;

receiving a channel state information (CSI) request;

transmitting CSI feedback in response to the CSI request, the CSI feedback comprising one or more CSI reports for the subset of the two or more aggregated CCs specified by the one or more bits, the CSI reports being determined based on the two or more reference signals, wherein the CSI feedback is transmitted on a physical uplink shared channel (PUSCH) indicated by $I_{MCS}$ = 29 and $N_{PRB}$ ≤ L, where L is a fixed number that does not vary with $$N_{CC}^{DL},$$

where $I_{MCS}$ Tepresems a modulation and coding scheme value, $N_{PRB}$ represents a number of allocated physical resource blocks, and $$N_{CC}^{DL}$$

represents a number of downlink component carriers, and wherein there is no associated uplink shared (UL-SCH) data on the PUSCH indicated by $I_{MCS}$ =29 and $N_{PRB}$ ≤ L.

8. The method of claim 7, further comprising receiving a plurality of uplink grants for the two or more aggregated component carriers, wherein the CSI request is contained within only one of the plurality of uplink grants.

9. A user equipment device comprising:

circuitry configured to receive two or more reference signals corresponding to two or more aggregated component carriers (CCs), and to receive one or more bits via RRC signaling, the one or more bits specifying a subset of the two or more aggregated CCs; and circuitry configured to transmit channel state information (CSI) feedback in response to a channel state information (CSI) request, the CSI feedback comprising one or more CSI reports for the subset of the two or more aggregated CCs specified by the one or more bits, the CSI reports being determined based on the two or more reference signals, wherein the CSI feedback is transmitted on a physical uplink shared channel (PUSCH) indicated by $I_{MCS}$ =29 and $N_{PRB}$ ≤ L, where L is a fixed number that does not vary with $$N_{CC}^{DL},$$

where $I_{MCS}$ represents a modulation and coding scheme value, $N_{PRB}$ represents a number of allocated physical resource blocks, and $$N_{CC}^{DL}$$

represents a number of downlink component carriers, and wherein there is no associated uplink shared (UL-SCH) data on the PUSCH indicated by $I_{MCS}$ =29 and $N_{PRB}$ ≤ L.

10. The device of claim 9, wherein the processor is further configured to receive a plurality of uplink grants for the two or more aggregated component carriers, wherein the CSI request is contained within only one of the plurality of uplink grants.

* * * * *